(12) United States Patent
Sprenger et al.

(10) Patent No.: US 11,608,919 B2
(45) Date of Patent: Mar. 21, 2023

(54) UNIVERSAL QUICK DISCONNECT

(71) Applicant: INTEL CORPORATION, Santa Clara, CA (US)

(72) Inventors: Mark Sprenger, Folsom, CA (US); Joseph Broderick, Beaverton, OR (US); Aaron Anderson, Beaverton, OR (US); Kenan Arik, Hillsboro, OR (US); Brian Jarrett, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 203 days.

(21) Appl. No.: 16/287,418

(22) Filed: Feb. 27, 2019

(65) Prior Publication Data

US 2019/0195407 A1   Jun. 27, 2019

Related U.S. Application Data

(60) Provisional application No. 62/636,085, filed on Feb. 27, 2018.

(51) Int. Cl.
| | |
|---|---|
| *F16L 37/08* | (2006.01) |
| *F16L 29/04* | (2006.01) |
| *F16L 37/60* | (2006.01) |
| *F16L 37/23* | (2006.01) |
| *F16L 37/084* | (2006.01) |
| *F16L 37/00* | (2006.01) |

(52) U.S. Cl.
CPC ........... *F16L 37/08* (2013.01); *F16L 37/0841* (2013.01); *F16L 37/23* (2013.01); *F16L 37/60* (2013.01); *F16L 37/006* (2013.01)

(58) Field of Classification Search
CPC . F16L 37/08; F16L 37/60; F16L 37/23; F16L 37/0841; F16L 29/02; F16L 29/04; F16L 37/28; F16L 37/38
USPC .......................................... 137/614.03–614.5
See application file for complete search history.

(56) References Cited

U.S. PATENT DOCUMENTS

| | | | | |
|---|---|---|---|---|
| 3,478,762 | A * | 11/1969 | McCullough | F16L 23/036 137/71 |
| 4,582,347 | A * | 4/1986 | Wilcox et al. | F16L 29/02 285/12 |
| 4,691,941 | A * | 9/1987 | Rabushka | F16L 55/1015 137/614.04 |
| 4,982,761 | A * | 1/1991 | Kreczko et al. | F16L 37/0848 137/614.03 |
| 5,290,009 | A * | 3/1994 | Heilmann | F16L 37/23 251/149.6 |
| 5,323,812 | A * | 6/1994 | Wayne | F16L 37/35 285/306 |
| 6,557,904 | B2 * | 5/2003 | Naito | F16L 29/02 251/149.6 |
| 7,921,875 | B2 * | 4/2011 | Moriiki et al. | F16L 37/23 137/614.03 |
| 8,303,000 | B2 * | 11/2012 | Liu | F16L 37/23 137/614.05 |

(Continued)

*Primary Examiner* — Paul J Gray
(74) *Attorney, Agent, or Firm* — Compass IP Law PC (57) ABSTRACT

Couplings are disclosed herein. A plug of a coupling includes a plug body and a socket interface coupled to the plug body. The socket interface includes a shoulder extending axially outward from the plug body, a neck extending axially outward and radially inward from the shoulder, and a socket guide extending axially outward and radially outward from the neck.

14 Claims, 9 Drawing Sheets

(56) References Cited

U.S. PATENT DOCUMENTS

| | | | |
|---|---|---|---|
| 8,602,057 B2 | 12/2013 | Abura et al. | |
| 8,783,655 B2* | 7/2014 | Hsieh | F16L 37/32 |
| | | | 251/149.4 |
| 9,279,529 B2* | 3/2016 | Zhang et al. | F16L 29/04 |
| 10,851,929 B2* | 12/2020 | Tiberghien et al. | F16L 37/23 |
| 2003/0085574 A1* | 5/2003 | Froment | F16L 37/42 |
| | | | 285/376 |
| 2011/0313576 A1* | 12/2011 | Nicewonger | F28D 15/00 |
| | | | 700/282 |

* cited by examiner

Open position
FIG. 20

Closed position
FIG. 21

Closed position
FIG. 22

Open position
FIG. 23

UNIVERSAL QUICK DISCONNECT

CROSS-REFERENCE TO RELATED U.S. PATENT APPLICATION

The present application claims priority under 35 U.S.C. § 119(e) to U.S. Provisional Application Ser. No. 62/636,085 filed Feb. 27, 2018, entitled "Universal Quick Disconnect," which is hereby incorporated by reference in its entirety.

BACKGROUND

Couplings employed in cooling systems or other applications may facilitate repair, upgrading, servicing, and/or replacement of components with minimal downtime. Liquid cooling systems may employ various couplings depending on, among other things, the type of cooling system and the working fluid(s) used therein. Development of couplings that are suited for use in a number of liquid cooling system applications remains an area of interest.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
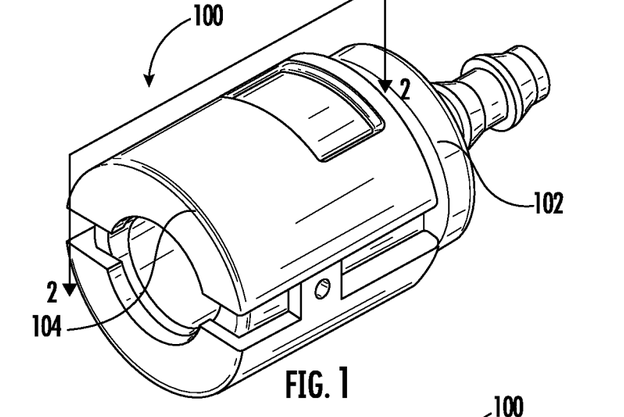
FIG. 1 is a perspective view of a quick disconnect coupling including a socket and a plug received by the socket.

Referring now to FIG. 1, an illustrative coupling 100 includes a plug 102 and a socket 104 that receives the plug 102. The coupling 100 illustratively includes, or is otherwise embodied as, a quick disconnect (QD) coupling. In some embodiments, the QD coupling 100 may be coupled to, included in, or otherwise form a portion of, a cooling system that includes one or more cooling units, such as heat exchangers, for example. In those embodiments, the QD coupling 100 may be used to supply fluid between one or more components of the cooling system, such as conduits of the cooling system, for example. Furthermore, in such embodiments, the cooling system may be used to dissipate heat generated by electronic devices during operation of the devices, such as electronic components of a sled mounted in a rack of a data center, for example. In any case, each of the plug 102 and the socket 104 may be formed from metallic or polymeric materials, or have another suitable construction. In embodiments using polymeric materials, a low friction material could be used to for plug 102 to facilitate easier movement of the socket 104 with respect to the plug 102.

Figure 2:
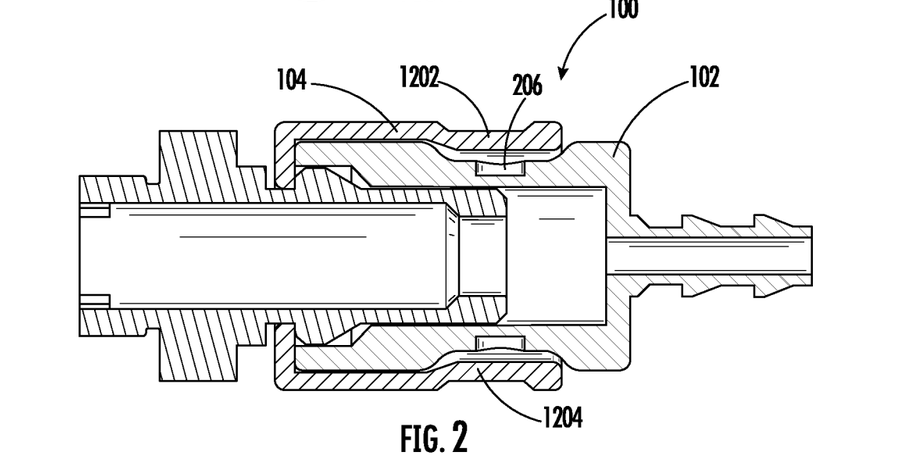
FIG. 2 is a sectional view of the quick disconnect coupling of FIG. 1 taken about line 2-2.

Referring now to FIG. 2, the QD coupling 100 illustratively includes a lock mechanism 206 that secures the plug 102 to the socket 104 when the plug 102 is received by the socket 104. The lock mechanism 206 includes spring biasers 1108 (see FIGS. 11 and 12) that bias the plug 102 toward contact with the socket 104 when the plug 102 is received by the socket 104.

Figure 3:
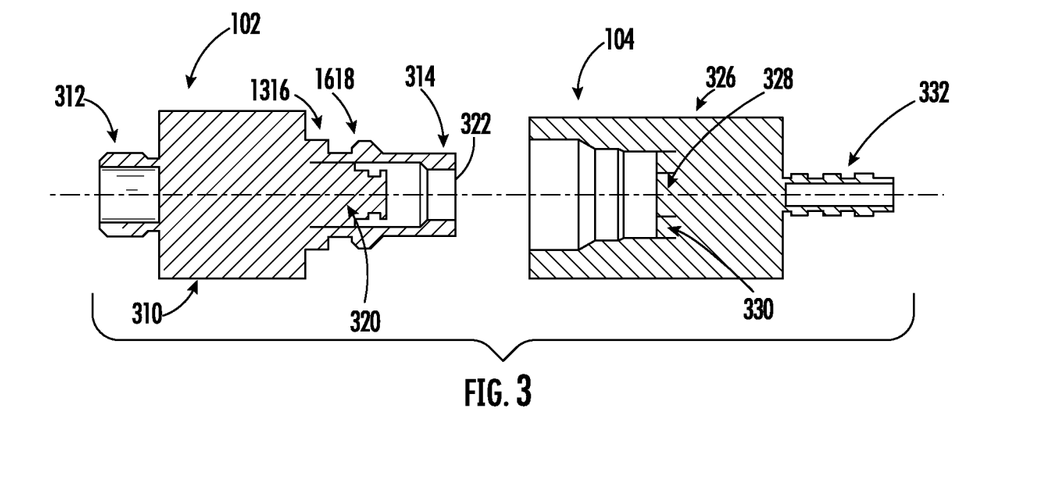
FIG. 3 is a partial sectional view of the quick disconnect coupling of FIG. 1 with the plug removed from the socket.

Referring now to FIG. 3, the illustrative plug 102 includes a plug body 310, a plug boss 312 coupled to the plug body 310, and a socket interface 314 coupled to the plug body 310 opposite the plug boss 312. As discussed below, the socket interface 314 and certain features of the socket 104 cooperatively provide a ball lock mechanism 1316 (see FIGS. 13-15) and a shear lock mechanism 1618 (see FIGS. 16-19) that secure the plug 102 to the socket 104. In some embodiments, the ball lock and shear lock mechanisms 1316 and 1618 may provide redundant devices for securing the plug 102 to the socket 104. The plug 102 also includes a valve arrangement, such as a poppet 320 that is received in the plug body 310 and a sealing surface 322 that contacts the socket 104 to provide a seal prior to movement of the poppet 320 relative to the plug body 310 and the socket interface 314. The socket interface 314 terminates at the sealing surface 322. The poppet 320 and seal selectively allow/prevent flow through the plug body 310.

The illustrative socket 104 includes a socket body 326, a socket stem 328 formed in, or otherwise received by, the socket body 326, a plunger 330 formed in, or otherwise received by, the socket body 326, and a socket barb 332 coupled to the socket body 326. Each of the socket stem 328, the plunger 330, and the socket barb 332 may be movable relative to the socket body 326.

Figure 4:
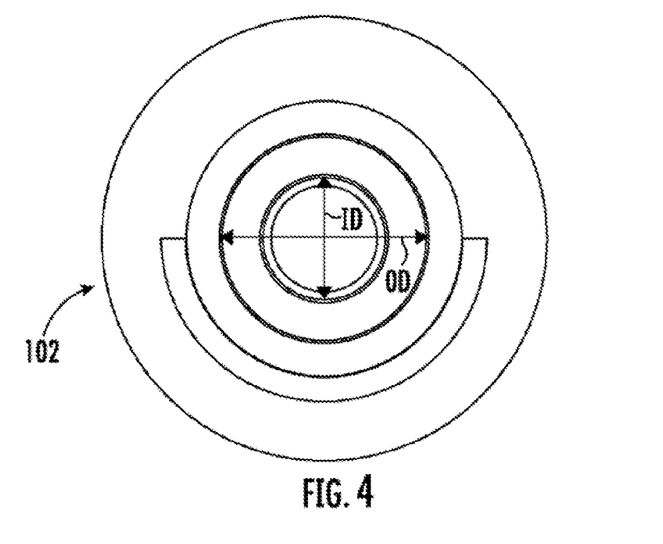
FIG. 4 is a partial front elevation view of the plug of the quick disconnect coupling of FIG. 1.

Referring now to FIG. 4, the plug 102 may have an inner diameter ID of about 14.2 mm and an outer diameter OD of about 18.7 mm. A trigger stroke (not shown) may be about 2.6 mm.

Figure 5:
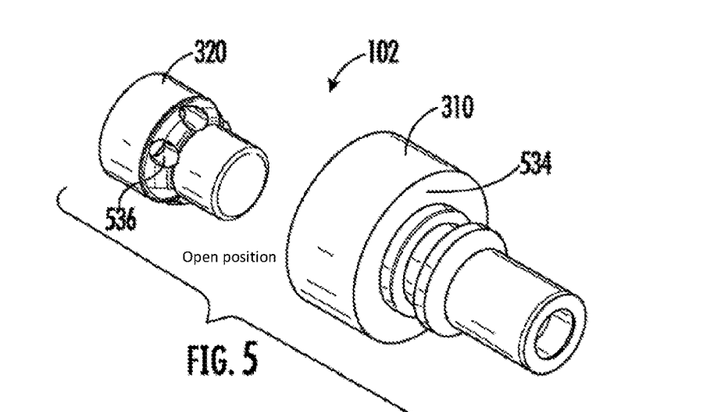
FIG. 5 is an exploded perspective view of the plug of the quick disconnect coupling of FIG. 1.

Referring now to FIG. 5, the poppet 320 is illustratively received in a central passage 534 that extends through the plug body 310. The poppet 320 is formed to include poppet apertures 536 through which fluid may be conducted during operation of the QD coupling 110.

Figure 6:
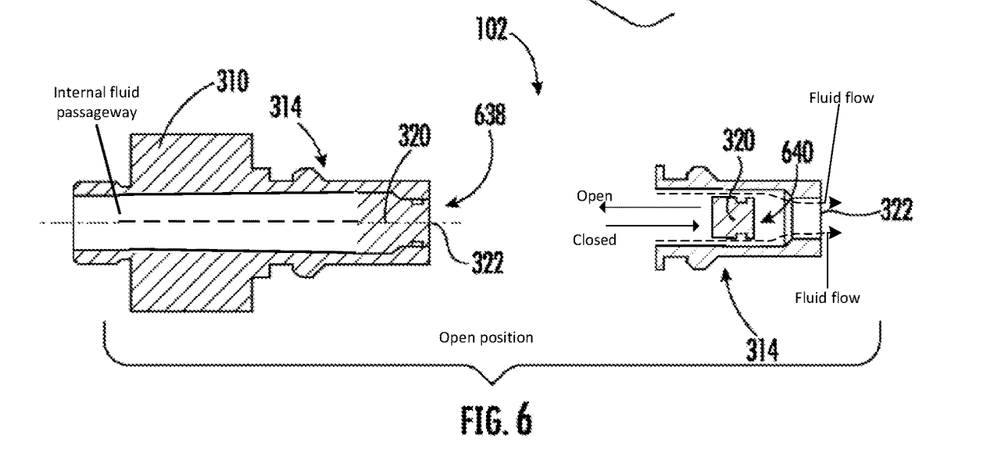
FIG. 6 is a sectional view of the plug shown in FIG. 5 with a poppet of the plug depicted in de-stroked and stroked positions relative to a plug body of the plug.

Referring now to FIG. 6, the poppet 320 is movable relative to the plug body 310 and the socket interface 314 between a de-stroked position 638 and a stroked position 640. In the de-stroked position 638, the poppet 320 is flush with the sealing surface 322. In the stroked position 640, the poppet 320 moves axially relative to the plug body 310 and the socket interface 314 away from the sealing surface 322 (e.g., to the left side of the surface 322) such that the poppet 320 is spaced from the sealing surface 322.

Figure 7:
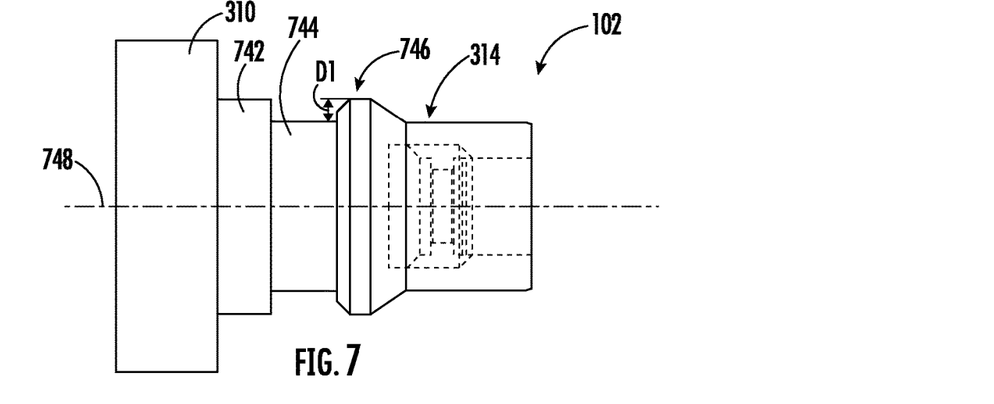
FIG. 7 is a partial side elevation view of the plug of the quick disconnect coupling of FIG. 1.
Figure 8:
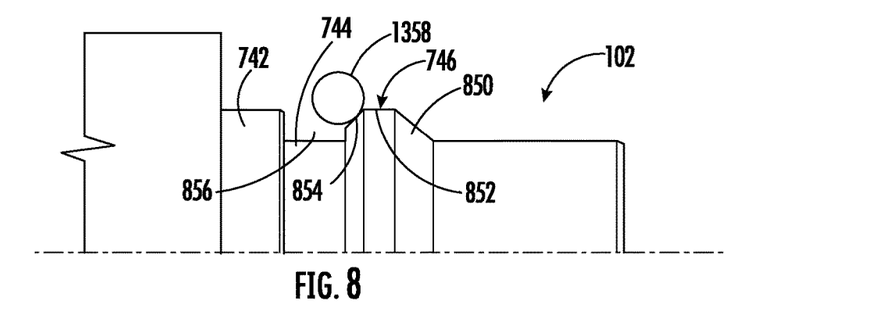
FIG. 8 is a partial side elevation view of the plug shown in FIG. 7 with a ball of the socket depicted in phantom.

Referring now to FIGS. 7 and 8, the illustrative socket interface 314 of the plug 102 includes a shoulder 742, a neck 744, and a socket guide 746. The shoulder 742 extends axially outward from the plug body 310 along a central axis 748. The neck 744 extends axially outward from the shoulder 742 along the axis 748 and radially inward toward the axis 748. The socket guide 746 extends axially outward from the neck 744 along the axis 748 and radially outward away from the axis 748.

The illustrative socket guide 746 includes a ramp 850, a plateau 852 coupled to the ramp 850, and a chamfered seat 854 coupled to the plateau 852, as best seen in FIG. 8. The ramp 850 is inclined to the central axis 748. The plateau 852 extends substantially parallel to the central axis 748. The chamfered seat 854 is declined relative to the plateau 852 and the central axis 748.

In the illustrative embodiment, the shoulder 742, the neck 744, and the socket guide 746 cooperatively define a groove 856 of the plug 102, as shown in FIG. 8. When a ball 1358 (see FIGS. 13-15) of the socket 104 is seated against the chamfered seat 854 as shown in FIG. 15 such that the ball lock mechanism 1316 is in an activated state 1560, a portion of the ball 1358 is positioned in the groove 856. Additionally, when the shear lock mechanism 1618 is in an activated state 1800 shown in FIG. 18, a trigger 1664 of the socket 104 is positioned in the groove 856. In the illustrative embodiment, the chamfered seat 854 may have a depth D1 of about 1.10 mm. In some embodiments, the design of the chamfered seat 854 may comply with one or more parameters of ISO 16028.

Figure 9:
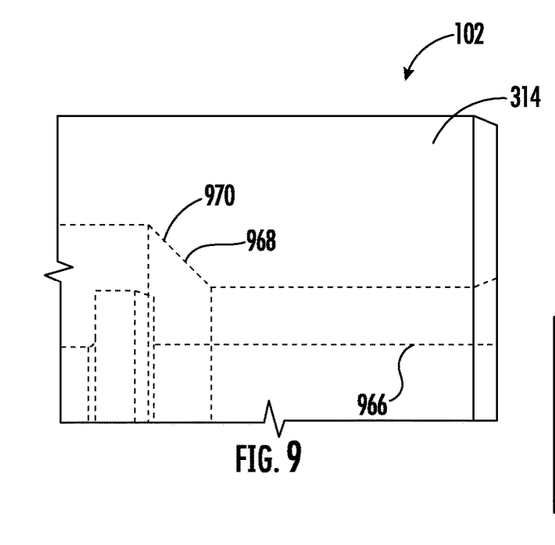
FIG. 9 is a detail view of a portion of a socket interface of the plug shown in FIG. 7.

Referring now to FIG. 9, the plug 102 may have a stroke length 966 measured at the socket interface 314 of about 6 mm. The socket interface 314 may provide, or otherwise be formed to include, a choke point 968. An angle 970 measured in proximity of the choke point 968 may be about 60 degrees. Depending on the circumstances, the socket interface 314 may have a nominal size of 6.35 mm, a nominal pipe area of 31.67 mm, a stroke of 6.5+(5 mm stem), and an area ratio of 1.047 mm.

Stroke may be added to account for the stem length. The flow area presuming a 6.5 mm stroke may be about 33.17 mm. The flow area presuming a 6.0 mm stroke may be about 22.80 mm. The flow area presuming a 6.25 mm stroke may be about 27.91 mm. The flow area presuming a 6.30 mm stroke may be about 28.95 mm. The flow area presuming a 6.40 mm stroke may be about 31.05 mm. The flow area presuming a 6.6 mm stroke may be about 35.31 mm. The flow area presuming a 6.7 mm stroke may be about 39.66 mm. The flow area presuming a 5.1 mm stroke may be about 5.52 mm. The gain with an angle of about 60 degrees is 20.74. Presuming that the stem is about 5 mm, then the total stroke may be 11.5 mm.

Figure 10:
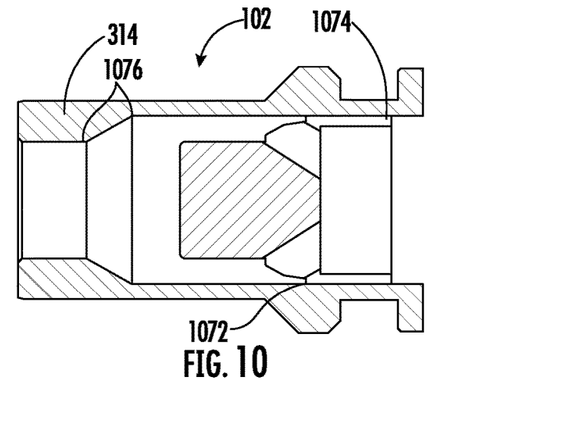
FIG. 10 is a partial sectional view of the plug shown in FIG. 7.

Referring now to FIG. 10, the socket interface 314 may be sized, accounting for clearances and tolerances, such that the points 1072, 1074 do not contact when the points 1076 are in contact with the chamfer.

Figure 11:
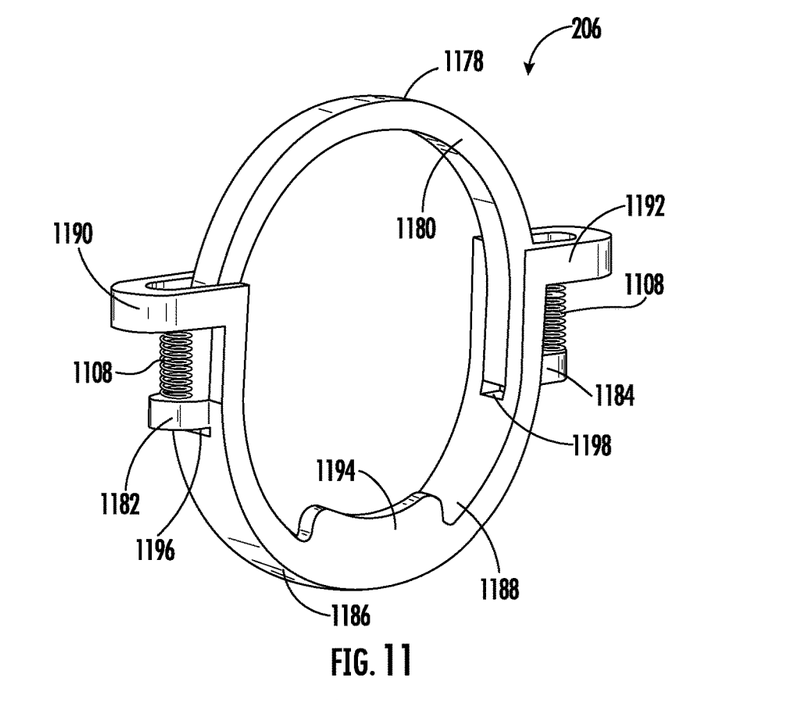
FIG. 11 is a perspective view of one lock mechanism of the quick disconnect coupling of FIG. 1 that may be used to secure the plug to the socket when the plug is received by the socket.

Referring now to FIG. 11, the lock mechanism 206 may be coupled to, included in, or otherwise form a portion of, the socket 104. The lock mechanism 206 includes a generally U-shaped component 1178. The component 1178 includes a body 1180 and end tabs 1182, 1184 coupled to the body 1180 opposite one another. The body 1180 terminates at the end tabs 1182, 1184 and each of the end tabs 1182, 1184 extends outwardly from the body 1180 and away from one another.

The lock mechanism 206 includes a generally U-shaped component 1186 as shown in FIG. 11. The component 1186 includes a body 1188, end tabs 1190, 1192 coupled to the body 1188 opposite one another, and a projection 1194 that extends outwardly from the body 1188 and is substantially equidistant from each end tab 1190, 1192. The body 1188 terminates at the end tabs 1190, 1192 and each of the end tabs 1190, 1192 extends outwardly from the body 1188 and away from one another. A slot 1196 extends through the body 1188 and the end tab 1190, and a slot 1198 extends through the body 1188 and the end tab 1192.

The components 1178, 1186 interface with one another such that the component 1178 is received by the slots 1196, 1198 of the component 1186 as shown in FIG. 11. The body 1180 of the component 1178 is received in the slots 1196, 1198 and the end tabs 1182, 1184 extend through the slots 1196, 1198 such that the end tabs 1182, 1184 are at least partially positioned outside of the slots 1196, 1198. One of the spring biasers 1108 is arranged between the end tab 1182 and the end tab 1190 such that the spring biaser 1108 contacts each of the end tabs 1182, 1190. Another of the spring biasers 1108 is arranged between the end tab 1184 and the end tab 1192 such that the spring biaser 1108 contacts each of the end tabs 1184, 1192.

Figure 12:
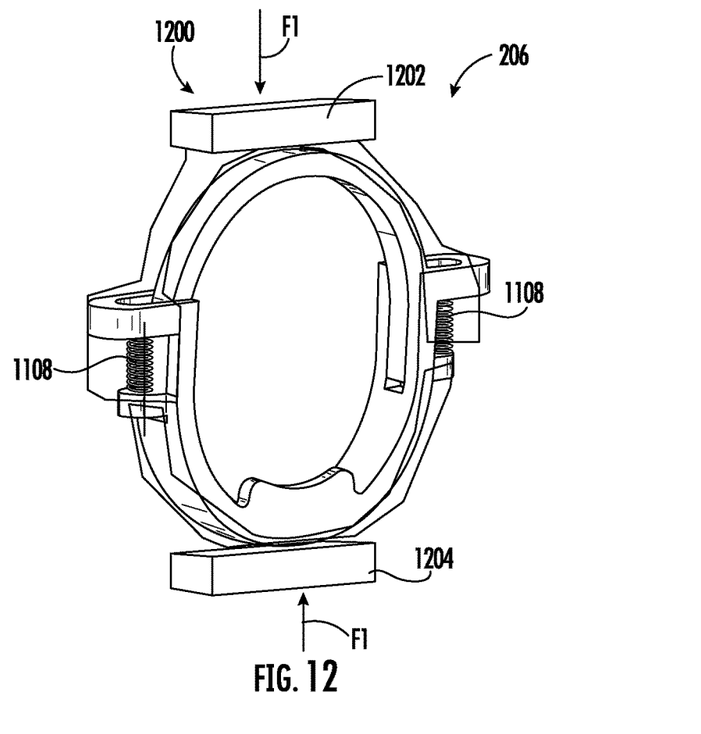
FIG. 12 is a perspective view of the lock mechanism of FIG. 11 with forces applied to the lock mechanism to open the lock mechanism.

Referring now to FIG. 12, to place the lock mechanism 206 in an unlocked, de-activated state 1200, forces F1 may be applied to buttons 1202, 1204. The buttons 1202, 1204 may be coupled to, formed in, or otherwise provided by the socket body 326, as shown in FIG. 2, for example.

Figure 13:
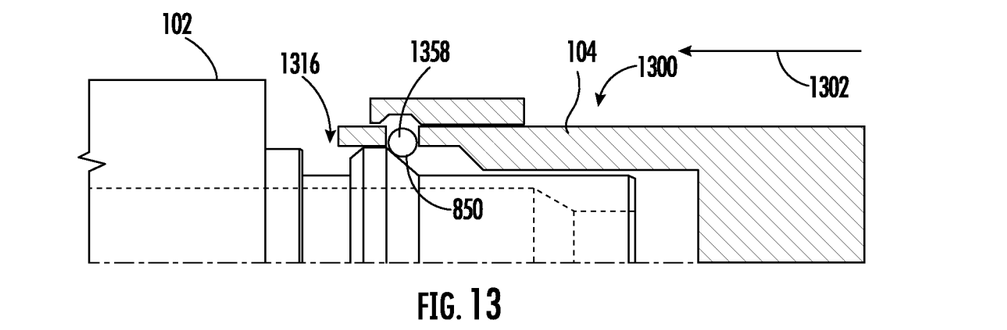
FIG. 13 is a partial sectional view of the quick disconnect coupling of FIG. 1 with a ball lock mechanism of the quick disconnect coupling in a first state.
Figure 14:
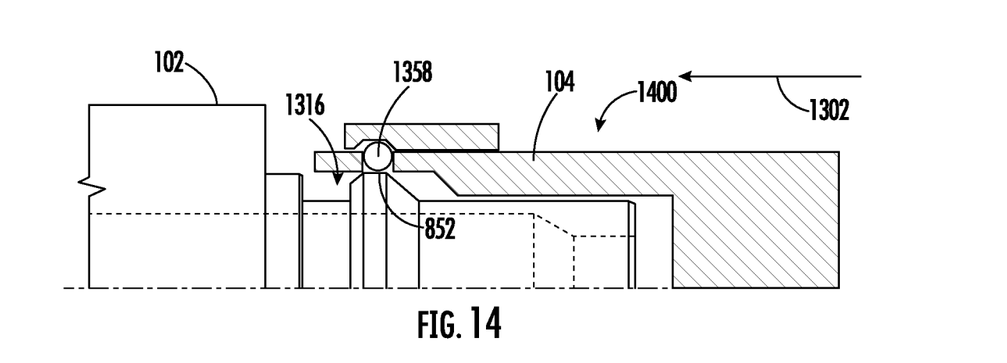
FIG. 14 is a partial sectional view of the quick disconnect coupling similar to FIG. 13 with the ball lock mechanism in an unlocked state.
Figure 15:
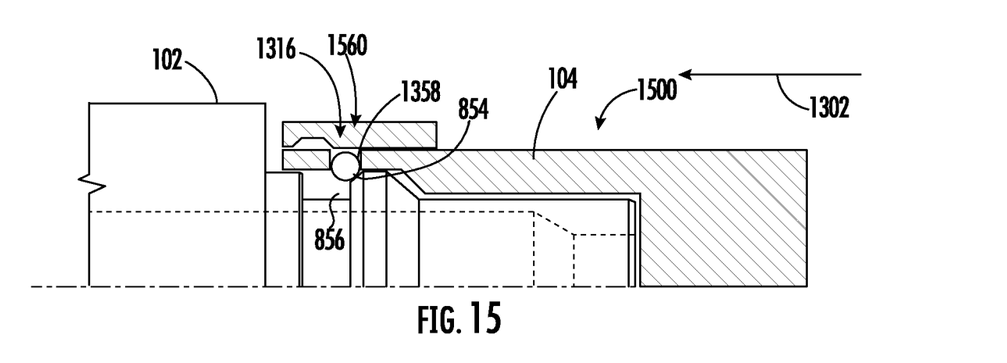
FIG. 15 is a partial sectional view of the quick disconnect coupling similar to FIG. 13 with the ball lock mechanism in a locked state.
Figure 16:
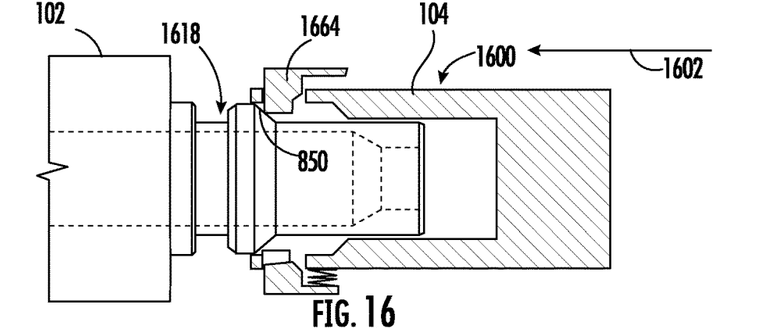
FIG. 16 is a partial sectional view of the quick disconnect coupling similar to FIG. 13 with a shear lock mechanism of the quick disconnect coupling in a first state.
Figure 17:
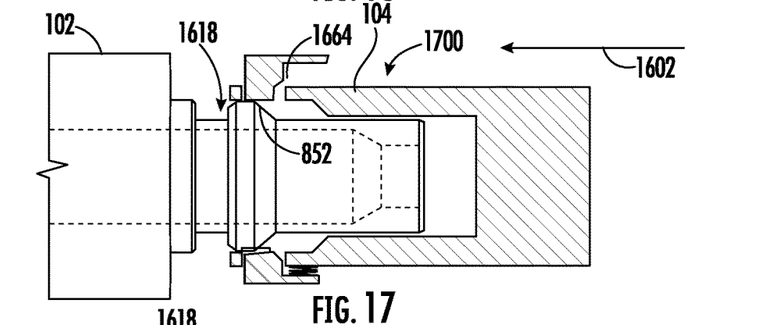
FIG. 17 is a partial sectional view of the quick disconnect coupling similar to FIG. 13 with the shear lock mechanism in a second state.
Figure 18:
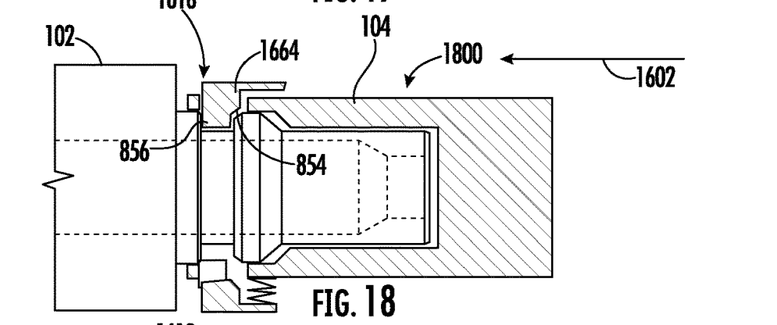
FIG. 18 is a partial sectional view of the quick disconnect coupling similar to FIG. 13 with the shear lock mechanism in a locked state.
Figure 19:
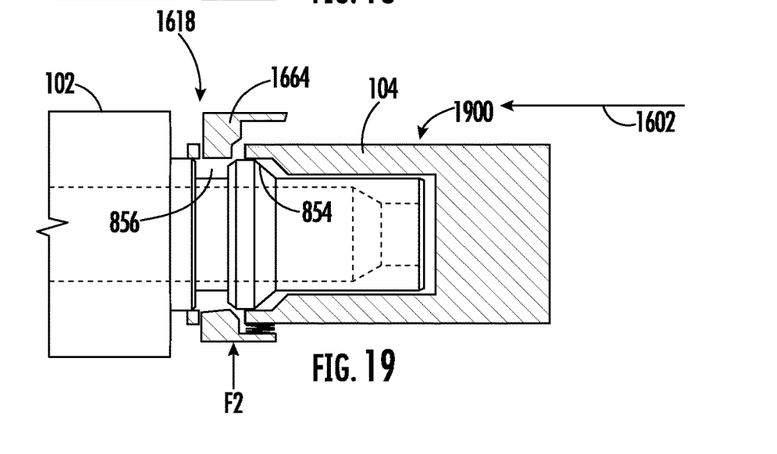
FIG. 19 is a partial sectional view of the quick disconnect coupling similar to FIG. 13 with the shear lock mechanism in an unlocked state.
Figure 20:
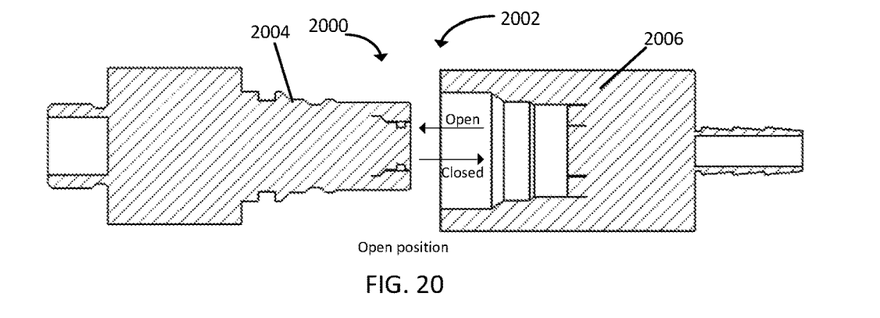
FIG. 20 is a partial sectional view of another coupling including a plug and a socket with the coupling in a de-coupled operating state.
Figure 21:
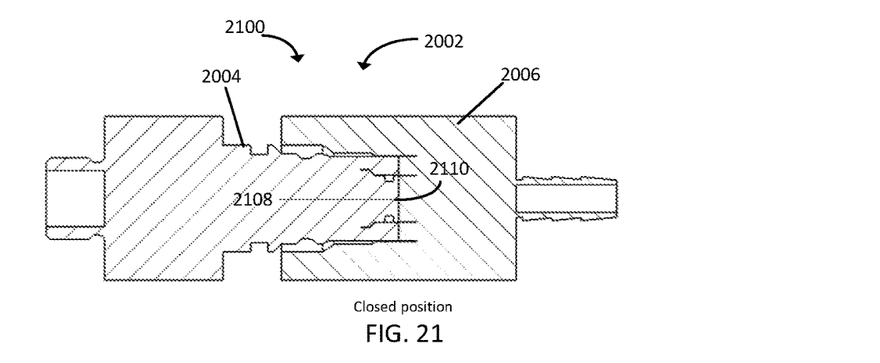
FIG. 21 is a partial sectional view of the coupling of FIG. 20 with the coupling in a contacted operating state.
Figure 22:
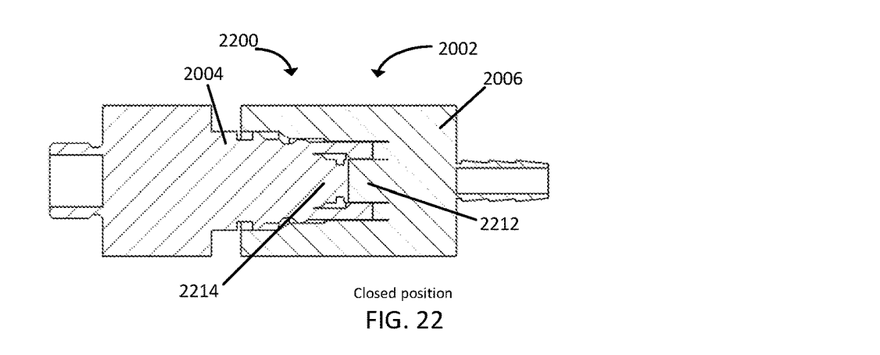
FIG. 22 is a partial sectional view of the coupling of FIG. 20 with the coupling in a partially stroked operating state.
Figure 23:
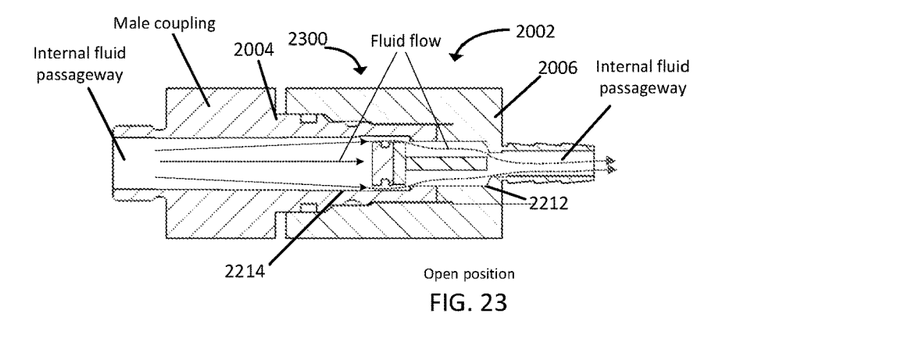
FIG. 23 is a partial sectional view of the coupling of FIG. 20 with the coupling in a fully coupled operating state.

Referring now to FIGS. 13-15, operation of the ball lock mechanism 1316 is depicted. In an initial operational state 1300 of the lock mechanism 1316 shown in FIG. 13, the socket 104 advances relative to the plug 102 in the direction 1302 such that the ball 1358 contacts and climbs the ramp 850. In an operational state 1400 of the lock mechanism 1316 shown in FIG. 14, the socket 104 advances relative to the plug 102 in the direction 1302 such that the ball 1358 contacts and moves along the plateau 852 (i.e., after the ball 1358 advances from the ramp 850 to the plateau 852). When the ball 1358 contacts the plateau 852, the ball lock mechanism 1316 is in an unlocked, de-activated state. Therefore, the operational state 1400 is embodied as, or otherwise includes, a de-activated state of the ball lock mechanism 1316 in which the plug 102 is unsecured to, and thus able to move axially and/or rotate relative to, the socket 104 by the lock mechanism 1316. In an operational state 1500 of the lock mechanism 1316 shown in FIG. 15, the socket 104 advances relative to the plug 102 in the direction 1302 such that the ball 1358 contacts and seats against the chamfered seat 854 (i.e., after the ball 1358 advances from the plateau 852 to the seat 854). When the ball 1358 seats against the seat 854, the ball lock mechanism is in a locked, activated state. Therefore, the operational state 1500 is embodied as, or otherwise includes, an activated state of the ball lock mechanism 1316 in which the plug 102 is at least partially secured to, and at least partially constrained against axial and/or rotational movement relative to, the socket 104 by the lock mechanism 1316.

Referring now to FIGS. 16-19, operation of the shear lock mechanism 1618 is depicted. In an initial operational state 1600 of the lock mechanism 1618 shown in FIG. 16, the socket 104 advances relative to the plug 102 in the direction 1602 such that the trigger 1664 contacts and climbs the ramp 850. In an operational state 1700 of the lock mechanism 1618 shown in FIG. 17, the socket 104 advances relative to the plug 102 in the direction 1602 such that the trigger 1664 contacts and moves along the plateau 852 (i.e., after the trigger 1664 advances from the ramp 850 to the plateau 852). In an operational state 1800 of the lock mechanism 1618 shown in FIG. 18, the socket 104 advances relative to the plug 102 in the direction 1602 such that the trigger 1664 is received in the groove 856 and contacts the chamfered seat 854 (i.e., after the trigger 1664 advances from the plateau 852 to the groove 856). When the trigger 1664 is received in the groove 856 and contacts the seat 854, the shear lock mechanism 1618 is in a locked, activated state. Therefore, the operational state 1800 is embodied as, or otherwise includes, an activated state of the shear lock mechanism 1618 in which the plug 102 is at least partially secured to, and at least partially constrained against axial and/or rotational movement relative to, the socket 104 by the lock mechanism 1618. In an operational state 1900 of the shear lock mechanism 1618, which may occur in response to application of a force F2 to the trigger 1664, the trigger 1664 moves out of the groove 856 such that the trigger 1664 does not contact the seat 854. When the trigger 1664 moves out of the groove 856, the shear lock mechanism 1618 is in an unlocked, de-activated state. Therefore, the operational state 1900 is embodied as, or otherwise includes, a de-activated state of the shear lock mechanism 1618 in which the plug 102 is unsecured to, and thus able to move axially and/or rotate relative to, the socket 104 by the shear lock mechanism 1618.

In view of the operation of the ball and shear lock mechanisms 1316, 1618 discussed above, the illustrative socket interface 314 is usable with conventional balls 1358 of one or more socket devices. However, the socket interface 314 is not scalable to a conventional ball-lock-groove mechanism. The socket interface 314 is designed for use with the balls 1358 of the socket 104 and to guide the trigger 1664 of the socket 104 into the groove 856 to resist occurrences of positive locks on the shear lock mechanism 1618. Compared to other configurations, the width of the groove 856 is extended to minimize the height and/or profile of the socket interface 314, which may allow for rotation of the shear lock mechanism 1618. Although the socket interface 314 is usable with a ball lock female socket or a shear lock female socket, design of the female socket for specific interaction with the socket interface 314 may be necessitated. Of course, it should be appreciated that the illustrative socket interface 314 is not scalable back to conventional lock mechanisms. Rather, the illustrative socket interface 314 is the product of significant engineering labor.

Referring now to FIGS. 20-23, a number of operational states of a coupling 2002 are depicted. The coupling 2002 includes a plug 2004 and a socket 2006 that receives the plug 2004. In an operational state 2000 shown in FIG. 20, the plug 2004 and the socket 2006 are de-coupled from one another. The operational state 2000 therefore corresponds to the "uncoupled" mode identified in the table below. In an operational state 2100 shown in FIG. 21, a surface 2108 of the plug 2004 is flush with, and contacts, a surface 2110 of the socket 2006. The operational state 2100 therefore corresponds to the "flush face" mode identified in the table below. In an operational state 2200 shown in FIG. 22, a plunger 2212 of the socket 2006 contacts a poppet 2214 of the plug 2004 to cause the poppet 2214 to move axially (e.g., stroke) to the left. The operational state 2200 therefore corresponds to the "mid stroke" mode identified in the table below. In an operational state 2300 shown in FIG. 23, contact of the poppet 2214 with the plunger 2212 causes the poppet 2214 to stroke all the way to the left to a fully stroked position in which the plug 2004 and the socket 2006 are fully coupled to one another. The operational state 2300 therefore corresponds to the "fully coupled" mode identified in the table below.

| Mode | Description |
|---|---|
| Uncoupled | Shutoff both ends, fully sealed no leak |
| Flush Face | Surface contact between plug and socket |
| | Not flowing, fully sealed on both sides, no leak |
| | Minimum volume between contacting surfaces |
| Mid Stroke | Poppet movement |
| | Plunger movement |
| | Spring compression |
| | Flow from zero to full flow |
| | Pressure ejection load (decoupling) |
| Fully Coupled | Locked in position with ball lock or shear lock |
| | Full flow |

Figure 24:
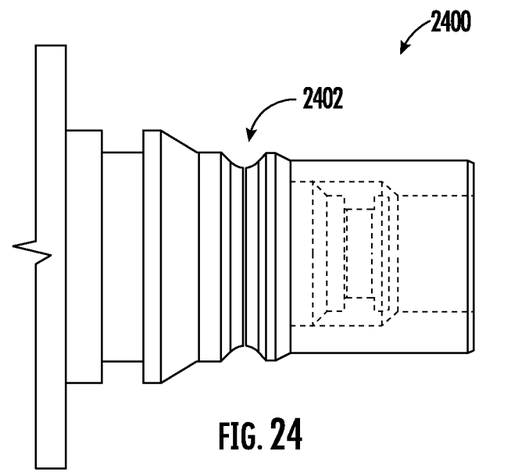
FIG. 24 is a partial side elevation view of a plug of a yet another coupling.
Figure 25:
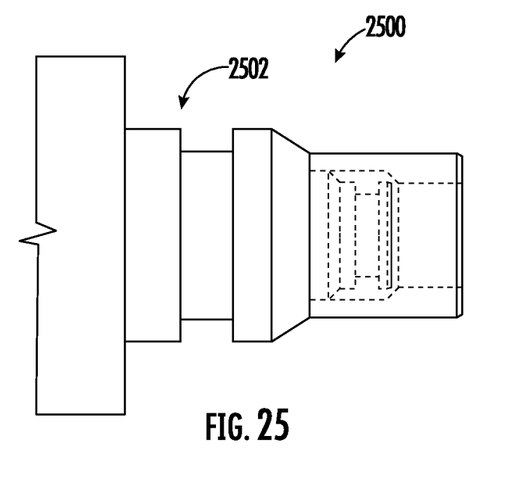
FIG. 25 is a partial side elevation view of a plug of yet another coupling still.

Referring now to FIGS. 24 and 25, plugs 2402 and 2502 of respective couplings 2400 and 2500 are shown. To provide acceptable flow capacity and fatigue life, a Rockwell scale hardness value of HRC 58 may be desirable. Notably, some specifications (e.g., ISO 16028) indicate that a minimum hardness value of HRC 50 is desirable. The plugs may be constructed of polymeric materials such as PVC or ABS, and in some cases, the material may have an ultimate tensile strength of about 8 ksi. A nominal size ½ in. pipe may have a thickness of about 0.17 inches. Presuming a burst pressure at about 1900 psi, an ultimate tensile strength of about 2.8 ksi may apply. Presuming an ultimate tensile strength of about 2.8 ksi, a burst pressure of about 625 psi, and a nominal size ¼ in. pipe, a thickness of about 0.028 in. may apply.

Figure 26:
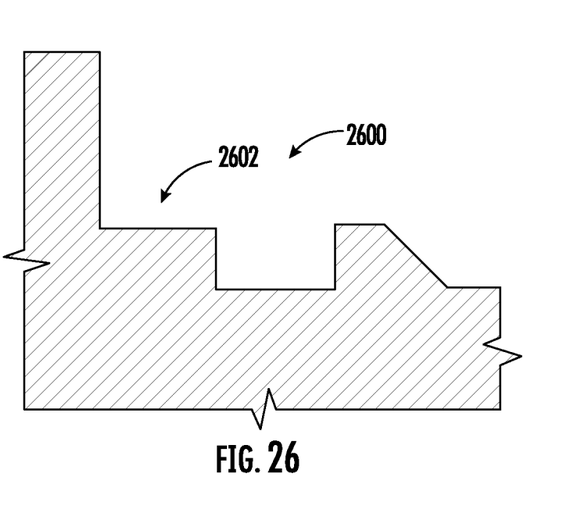
FIG. 26 is a detail view of a portion of at least one of the plugs of FIGS. 24 and 25.
Figure 27:
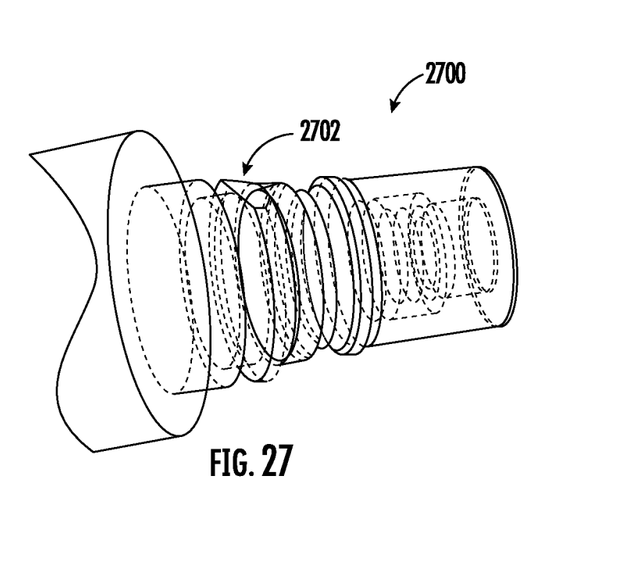
FIG. 27 is a partial perspective view of the plug of FIG. 24.

Referring now to FIGS. 26 and 27, plugs 2602 and 2702 of respective couplings 2600 and 2700 are shown. Presuming a construction of 300 series stainless steel, an estimated shear strength based on a mass shear stress theory of 0.5× ultimate tensile strength, one straight edge, and reaction of all ejection force through the coupling, a thickness of greater than or equal to 0.028 inches may apply. Presuming a plastic construction with an ultimate tensile strength of 8 ksi, an estimated shear strength based on a mass shear stress theory of 0.75× ultimate tensile strength, one straight edge, and reaction of all ejection force through the coupling, a thickness of greater than or equal to 0.069 inches may apply.

EXAMPLES

Illustrative examples of the coupling, plug and socket disclosed herein are provided below. An embodiment of the technologies may include any one or more, and any combination of, the examples described below.

Example 1 is a plug comprising a plug body, a valve arrangement, and a socket interface. The valve arrangement is movable between an open position that allows flow through the internal fluid passageway and a closed position that prevents flow through the internal fluid passageway. The socket interface is to engage a valve arrangement of a socket and includes an external surface feature to cooperatively facilitate securement of the plug to the socket with at least one of a first lock type and a second lock type of the socket.

Example 2 includes the subject matter of Example 1, and wherein: the socket interface extends longitudinally along a central axis and wherein the external surface feature is configured to engage with the first lock type and the second lock type responsive to linear movement of the socket with respect to the plug body along the central axis.

Example 3 includes the subject matter of Examples 1 and 2, and wherein: the external surface feature is configured to disengage the first lock type and the second lock type responsive to a force applied towards the socket interface on opposite sides of the central axis.

Example 4 includes the subject matter of Examples 1-3, and wherein: the valve arrangement includes a poppet movable between a first position that allows flow through the internal fluid passageway and a second position that prevents flow through the internal fluid passageway.

Example 5 includes the subject matter of Examples 1-4, and wherein: the poppet moves linearly between the first position and the second position along the central axis.

Example 6 includes the subject matter of Examples 1-5, and wherein: the external surface feature includes a shoulder extending axially outward from the plug body, a neck extending axially outward and radially inward from the shoulder, and a socket guide extending axially outward and radially outward from the neck Example 7 includes the subject matter of Examples 1-6, and wherein: the shoulder, the neck, and the socket guide cooperatively define a groove sized to at least partially receive both the first lock type and the second lock type of the socket.

Example 8 includes the subject matter of Examples 1-7, and wherein: the plug body has a first width, the shoulder has a second width less than the first width, the neck has a third width less than the second width, and the socket guide has a fourth width greater than the third width.

Example 9 includes the subject matter of Examples 1-8, and wherein: the socket guide includes a ramp that extends at an angle relative to a central axis of the plug, a plateau coupled to the ramp that extends parallel to the central axis, and a chamfered seat coupled to the plateau that extends at an angle relative to the central axis.

Example 10 includes the subject matter of Examples 1-9, and wherein: the ramp extends away from the central axis.

Example 11 includes the subject matter of Examples 1-10, and wherein: the chamfered seat extends toward the central axis.

Example 12 includes the subject matter of Examples 1-11, and wherein: the chamfered seat partially defines the groove.

Example 13 is a plug comprising a plug body, a valve arrangement, and a socket interface. The valve arrangement is movable between an open position that allows flow through the internal fluid passageway and a closed position that prevents flow through the internal fluid passageway. The socket interface is to engage a valve arrangement of a socket and includes means for engaging at least a first lock type and a second lock type of a socket to facilitate securement of the plug to the socket.

Example 14 includes the subject matter of Example 13, and wherein: the first lock type comprises a ball lock and the means for engaging is to receive at least a portion of the ball lock.

Example 15 includes the subject matter of Examples 13 and 14, and wherein: the second lock type comprises a shear lock and the means for engaging is to receive at least a portion of the shear lock.

Example 16 includes the subject matter of Examples 13-15, and wherein: the means for engaging comprises a groove defined in the socket interface sized to capture at least a portion of the ball lock and the shear lock.

Example 17 includes the subject matter of Examples 13-16, and wherein: the means for engaging is configured to disengage the first lock type and the second lock type responsive to a force applied towards the socket interface on opposite sides of the plug body.

Example 18 includes the subject matter of Examples 13-17, and wherein: the valve arrangement includes a poppet movable between a first position that allows flow through the internal fluid passageway and a second position that prevents flow through the internal fluid passageway.

Example 19 includes the subject matter of Examples 13-18, and wherein: the poppet moves linearly between the first position and the second position along a central axis of the plug body.

Example 20 includes the subject matter of Examples 13-19, and wherein: the means for engaging includes a shoulder extending axially outward from the plug body, a neck extending axially outward and radially inward from the shoulder, and a socket guide extending axially outward and radially outward from the neck Example 21 includes the subject matter of Examples 13-20, and wherein: the shoulder, the neck, and the socket guide cooperatively define a groove sized to at least partially receive both the first lock type and the second lock type of the socket.

Example 22 includes the subject matter of Examples 13-21, and wherein: the plug body has a first width, the shoulder has a second width less than the first width, the neck has a third width less than the second width, and the socket guide has a fourth width greater than the third width.

Example 23 includes the subject matter of Examples 13-22, and wherein: the socket guide includes a ramp that extends at an angle relative to a central axis of the plug, a plateau coupled to the ramp that extends parallel to the central axis, and a chamfered seat coupled to the plateau that extends at an angle relative to the central axis.

Example 24 includes the subject matter of Examples 13-23, and wherein: the ramp extends away from the central axis.

Example 25 includes the subject matter of Examples 13-24, and wherein: the chamfered seat extends toward the central axis.

Example 26 includes the subject matter of Examples 13-25, and wherein: the chamfered seat partially defines the groove.

Example 27 is a fluid coupling device comprising a socket and a plug. The socket includes a socket body, a valve arrangement, and at least one locking mechanism. The socket body defines an internal fluid passageway. The valve arrangement is movable between an open position that allows flow through the internal fluid passageway of the socket body and a closed position that prevents flow through the internal fluid passageway of the socket body. The plug includes a plug body, a valve arrangement, and a socket interface. The plug body defines an internal fluid passageway. The valve arrangement is movable between an open position that allows flow through the internal fluid passageway of the plug body and a closed position that prevents flow through the internal fluid passageway of the plug body. The socket interface is to engage the valve arrangement of the socket and includes an external surface feature to engage the at least one locking mechanism of the socket to cooperatively facilitate securement of the plug to the socket.

Example 28 includes the subject matter of Example 27, and wherein: the external surface feature includes a shoulder extending axially outward from the plug body, a neck extending axially outward and radially inward from the shoulder, and a socket guide extending axially outward and radially outward from the neck, wherein the shoulder, the neck, and the socket guide cooperatively define a groove sized to at least partially receive both a first lock type and a second lock type of the socket.

Example 29 includes the subject matter of Examples 27 and 28, and wherein: the plug body has a first width, the shoulder has a second width less than the first width, the neck has a third width less than the second width, and the socket guide has a fourth width greater than the third width.

Example 30 includes the subject matter of Examples 27-29, and wherein: the socket guide includes a ramp that extends at an angle relative to a central axis of the plug, a plateau coupled to the ramp that extends parallel to the central axis, and a chamfered seat coupled to the plateau that extends at an angle relative to the central axis.

Example 31 includes the subject matter of Examples 27-30, and wherein: the ramp extends away from the central axis.

Example 32 includes the subject matter of Examples 27-31, and wherein: the chamfered seat extends toward the central axis.

Example 33 includes the subject matter of Examples 27-32, and wherein: the chamfered seat partially defines the groove.

The invention claimed is:
1. A plug comprising:
a plug body defining an internal fluid passageway;
a valve arrangement movable between an open position that allows flow through the internal fluid passageway and a closed position that prevents flow through the internal fluid passageway; and
a socket interface to engage a valve arrangement of a socket, wherein the socket interface includes an external surface feature to cooperatively facilitate securement of the plug to the socket with a first lock type or, alternatively, a second lock type of the socket, wherein
the socket interface extends longitudinally along a central axis and wherein the external surface feature is configured to engage with the first lock type and the second lock type responsive to linear movement of the socket with respect to the plug body along the central axis,
the external surface feature includes a shoulder extending axially outward from the plug body, a neck extending axially outward and radially inward from the shoulder, and a socket guide extending axially outward and radially outward from the neck, and the shoulder, the neck, and the socket guide cooperatively define a groove sized to at least partially receive both the first lock type and the second lock type of the socket.

2. The plug of claim 1, wherein the external surface feature is configured to disengage the first lock type and the second lock type responsive to a force applied towards the socket interface on opposite sides of the central axis.

3. The plug of claim 1, wherein the valve arrangement includes a poppet movable between a first position that allows flow through the internal fluid passageway and a second position that prevents flow through the internal fluid passageway.

4. The plug of claim 3, wherein the poppet moves linearly between the first position and the second position along the central axis.

5. The plug of claim 1, wherein the plug body has a first width, the shoulder has a second width less than the first width, the neck has a third width less than the second width, and the socket guide has a fourth width greater than the third width.

6. The plug of claim 1, wherein the socket guide includes a ramp that extends at an angle relative to a central axis of the plug, a plateau coupled to the ramp that extends parallel to the central axis, and a chamfered seat coupled to the plateau that extends at an angle relative to the central axis.

7. The plug of claim 6, wherein the ramp extends away from the central axis.

8. The plug of claim 7, wherein the chamfered seat extends toward the central axis.

9. The plug of claim 6, wherein the chamfered seat partially defines the groove.

10. A plug comprising:
a plug body defining an internal fluid passageway;
a valve arrangement movable between an open position that allows flow through the internal fluid passageway and a closed position that prevents flow through the internal fluid passageway; and
a socket interface extending from the plug body, wherein
the socket interface includes means for engaging at least a first lock type, or alternatively, a second lock type of a socket to facilitate securement of the plug to the socket,
the socket interface extends longitudinally along a central axis, the means for engaging is configured to engage with the first lock type and wherein the second lock type responsive to linear movement of the socket with respect to the plug body along the central axis,
the first lock type comprises a ball lock and the means for engaging is to receive at least a portion of the ball lock, and
the second lock type comprises a shear lock and the means for engaging is to receive at least a portion of the shear lock.

11. The plug of claim 10, wherein the means for engaging comprises a groove defined in the socket interface sized to capture at least a portion of both the ball lock and the shear lock.

12. A fluid coupling device comprising:
a socket comprising:
a socket body defining an internal fluid passageway;
a valve arrangement movable between an open position that allows flow through the internal fluid passageway of the socket body and a closed position that prevents flow through the internal fluid passageway of the socket body;
a first lock type and a second lock type;
a plug comprising:
a plug body defining an internal fluid passageway;
a valve arrangement movable between an open position that allows flow through the internal fluid passageway of the plug body and a closed position that prevents flow through the internal fluid passageway of the plug body; and
a socket interface to engage the valve arrangement of the socket, wherein
the socket interface includes an external surface feature to engage the first lock type, or alternatively, the second lock type of the socket to cooperatively facilitate securement of the plug to the socket,
the socket interface extends longitudinally along a central axis and the socket interface includes an external surface feature configured to engage with the first lock type,
the second lock type is responsive to linear movement of the socket with respect to the plug body along the central axis,
the external surface feature includes a shoulder extending axially outward from the plug body, a neck extending axially outward and radially inward from the shoulder, and a socket guide extending axially outward and radially outward from the neck, and
the shoulder, the neck, and the socket guide cooperatively define a groove sized to at least partially receive both the first lock type and the second lock type of the socket.

13. The fluid coupling device of claim 12, wherein the plug body has a first width, the shoulder has a second width less than the first width, the neck has a third width less than the second width, and the socket guide has a fourth width greater than the third width.

14. The fluid coupling device of claim 12, wherein the socket guide includes a ramp that extends at an angle relative to a central axis of the plug, a plateau coupled to the ramp that extends parallel to the central axis, and a chamfered seat coupled to the plateau that extends at an angle relative to the central axis.

* * * * *